United States Patent [19]
Grabau et al.

[11] Patent Number: 5,871,395
[45] Date of Patent: Feb. 16, 1999

[54] METHOD FOR REMOVING THE BONES FROM FISH AND AN APPARATUS FOR CARRYING OUT THE METHOD

[75] Inventors: Thomas Grabau, Lübeck; Ulrich Gütte, Bad Oldesloe; Wolfgang Möller, Lübeck, all of Germany

[73] Assignee: Nordischer Maschinenbau Rud. Baader GmbH & Co KG, Lubeck, Germany

[21] Appl. No.: 744,069

[22] Filed: Nov. 4, 1996

[30] Foreign Application Priority Data

Nov. 6, 1995 [EP] European Pat. Off. .............. 95117398

[51] Int. Cl.[6] ................................... A22C 25/16
[52] U.S. Cl. ........................... 452/162; 452/161; 452/170
[58] Field of Search .................................... 452/162, 161, 452/170

[56] References Cited

U.S. PATENT DOCUMENTS

| | | | |
|---|---|---|---|
| 4,336,634 | 6/1982 | Braeger | 452/162 |
| 4,748,721 | 6/1988 | Braeger | 452/162 |
| 4,748,723 | 6/1988 | Braeger | 452/162 |
| 5,536,205 | 7/1996 | Braeger et al. | 452/161 |

FOREIGN PATENT DOCUMENTS 29 46 042  6/1981  Germany .

*Primary Examiner*—Willis Little
*Attorney, Agent, or Firm*—Fay,Sharpe,Beall, Fagan, Minnich & McKee

[57] ABSTRACT

The invention concerns a method for deboning fish of the mackerel family such as the Thunnus genus, the scomboid type and the like, and an apparatus for performing this method. Fish of this family have belly spokes extending along the full length of the backbone into the area of the belly cavity, so that conventional cutting free of the back and belly spokes will lead to a separation of the ribs from the remaining bone structure. To allow an accurate filetting of mackerel fish with their specific bone structure in the ventral cavity region, the invention suggests a slice of fish meat including the ribs to be cut free automatically by providing a computer controlled tool including a knife with a cutting edge diverging with respect to the conveying path of the fish, and a supporting element, which in combination with the knife allows the ribs to be cut away progressively while respecting the anatomical characteristics of the fish.

10 Claims, 2 Drawing Sheets

METHOD FOR REMOVING THE BONES FROM FISH AND AN APPARATUS FOR CARRYING OUT THE METHOD

BACKGROUND OF THE INVENTION

1. Field of the Invention

The invention concerns a method for deboning fish, specifically fish of the mackerel and tuna family, by cutting out a slice of the fish containing the back spokes, the belly spokes and the vertebral column and cutting away slices of the fish containing the ribs. The invention also relates to an apparatus for carrying out such, method, the apparatus including a conveyor for advancing the fish in the direction of extension of their vertebral column, with the vertebral column being aligned with the plane of symmetry of the, fish, tool are arranged, respectively, on both sides of the conveying path for cutting out the back spokes, the belly spokes, the vertebral column and the ribs the tools for cutting out the ribs comprise, respectively, a knife having a point directed against the conveying direction of the fish and a cutting edge starting from the point and diverging with respect to the conveying path.

2. Prior Art

Fish of the tuna and mackerel family including mackerel (scomber scombrus, scomber japonicus) and tunny (thunnus thynnus) as such, but also types varying throughout different waters such as pelamid, bonito, sea bass and the like have a particular anatomical characteristic associated with the belly cavity, which is enclosed by ribs, namely the dorsal side of the cavity is not delimited by the vertebral column as is the case for fish of the gadus family but is spaced from the vertebral column over a substantial portion of the cavity length. Thus the fish of this family possess belly spokes in the region of the belly cavity, as well, which extend from the vertebral column towards the ribs enclosing the cavity. The belly spokes located in the region of the gill cavity are the shortest so that the dorsal side delimitation of the belly cavity against the vertebral column diverges towards the tail end of the fish. In other words, when viewed in cross-section of the fish, the belly spokes and the ribs together form a structure similar to an inverted Y, with the ribs forming the two arms and the foot being formed by the belly spokes. Towards the gills, the Y-shape increasingly changes to a V-shape as the belly spokes become progressively shorter and the ribs finally extend directly from the flanks of the vertebral column.

In a device for separating fillets from fish known from DE 29 46 942, the tool for cutting free the ribs consists of a scraping tool having scraping knives arranged on both sides of the fish conveying path with a counter support in the form of a support element. Each scraping knife has a cutting edge which starts at a point and diverges away from the conveying path in the conveying direction. The counter support is arranged adjacent the cutting edge to yield resiliently. After the belly and back spokes have been cut free [at the tail-end of the fish] and the belly cavity and of the fish approaches the scraping knife, the point of the latter is guided into the trough formed between the back spokes and the start of the ribs on the vertebral column while the counter support supports the ribs from within the belly cavity. As the fish is advanced, the ribs are progressively separated from the fillet meat along their length.

The described function of the apparatus requires that the ribs remain connected to the fish bone structure throughout the separation operation so that the considerable clamping and separation forces applied to the ribs can be absorbed by the whole bone structure.

However, for the family of fish in question, the use of this known apparatus inevitably results in the ribs becoming detached from the bone structure when the belly spokes are being cut free. Consequently if bone-free fillets are required, the ribs must subsequently be cut away manually in a timeconsuming and costly manner.

OBJECTS OF THE INVENTION

It is thus a first object of the invention to provide a method for automatically and completely removing the bones from fish of the pelamide family.

It is a further important object of the invention to provide a method for automatically removing the bones from fish of the pelamide family with which the yield of fillet fish can be greatly improved.

It is a still further object of the invention to provide an apparatus for carrying out the method with high yield.

SUMMARY OF THE INVENTION

These and further objects are achieved in a method for deboning fish by cutting out a slice of the fish containing the back spokes, the belly spokes and the vertebral column and cutting away slices of the fish containing the ribs, by the step of progressively cutting away layers containing the ribs starting from the locations of the ribs at which they are attached to the belly spokes and being performed in an outward direction.

In an apparatus for deboning fish having a conveyor for advancing the fish in the extension direction of their vertebral column with the vertebral column being aligned with the plane of symmetry of the fish and tools arranged, respectively, on both sides of the conveying path for cutting out the back spokes, the belly spokes, the vertebral column and the ribs, the tools for cutting out the ribs comprising a knife, respectively, having a point directed against fie conveying direction of the fish and a cutting edge starting from this point and diverging away from the conveying path, these objects are further achieved in that each knife for cutting out the ribs is adapted to move so as to follow the contour of the dorsal side limitation of the belly cavity directly above the starting locations of the ribs on the belly spokes.

To this end, each knife is preferably provided with an actuation member and arranged to be adjusted such that its point will move in a plane lying parallel to the plane of symmetry of the fish. Furthermore the control of the knives can advantageously be ensured by a computer which calculates the respective time of entry into operation and the Respective control paths of the actuation members for each fish as a function of the measurement data obtained from measurement means for determining the position and size of each fish. These measurement means can efficaciously comprise a thickness sensor for detecting and registering the maximum thickness and the position of the trailing end of each fish.

In a preferred embodiment of the invention, the yield can be further optimised by associating with each knife for cutting out the ribs a supporting element arranged in spaced relation thereto, while leaving a gap, from the knife to oppose the cutting edge. The supporting element is usefully provided with an actuating member which is controllable by the computer to influence the spacing, i.e. the size of the gap, with respect to the cutting edge of the associated knife as a function of the measurement data from the measurement means. This allows for a fine adjustment of the spacing between the knife and supporting element in order to conform to the dimensions of the ribs. In other words, it is possible with this apparatus to maximise the yield while protecting the fillet meat from undesirable forces which arise when the ribs become clamped between the knife and supporting means.

BRIEF DESCRIPTION OF THE DRAWINGS

Further objects of the present invention will be apparent from the following description and claims and are illustrated in the accompanying drawings which schematically show a preferred embodiment of the present invention and the principles thereof and what now are considered to be the best modes contemplated for applying these principles. Other embodiments of the invention embodying the same or equivalent principles may be used and structural changes may be made as desired by those skilled in the art without departing from the present invention and the scope of the appended claims. In the drawings:

DESCRIPTION OF THE PREFERRED EMBODIMENT

Figure 1:
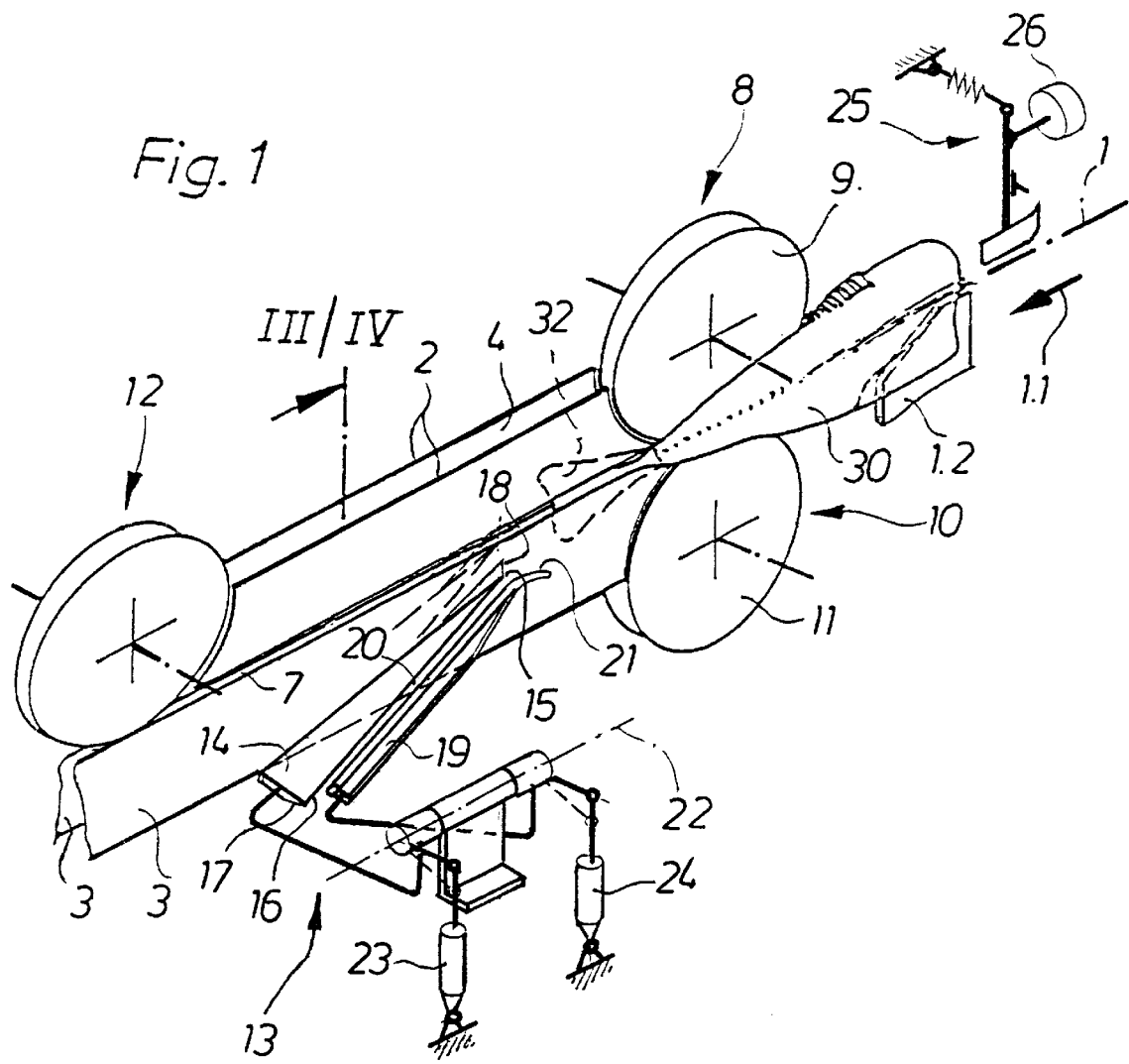
FIG. 1 is a perspective side view showing the boning device in simplified representation.
Figure 2:
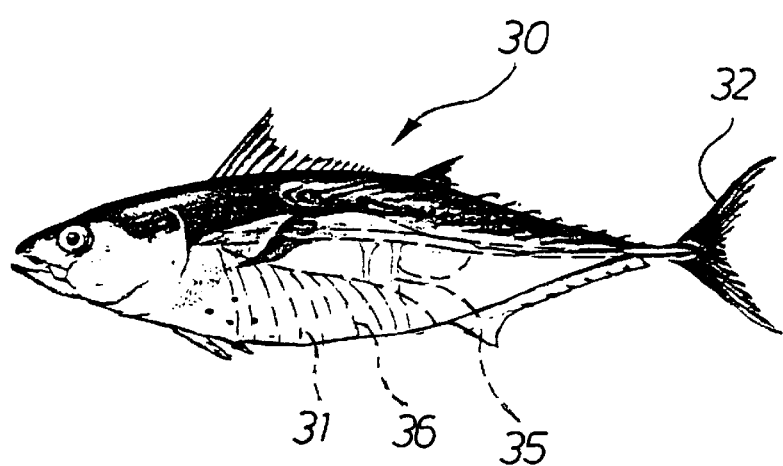
FIG. 2 shows a side view of a fish of the pelamide family with the belly cavity indicated.
Figures 3, 4:
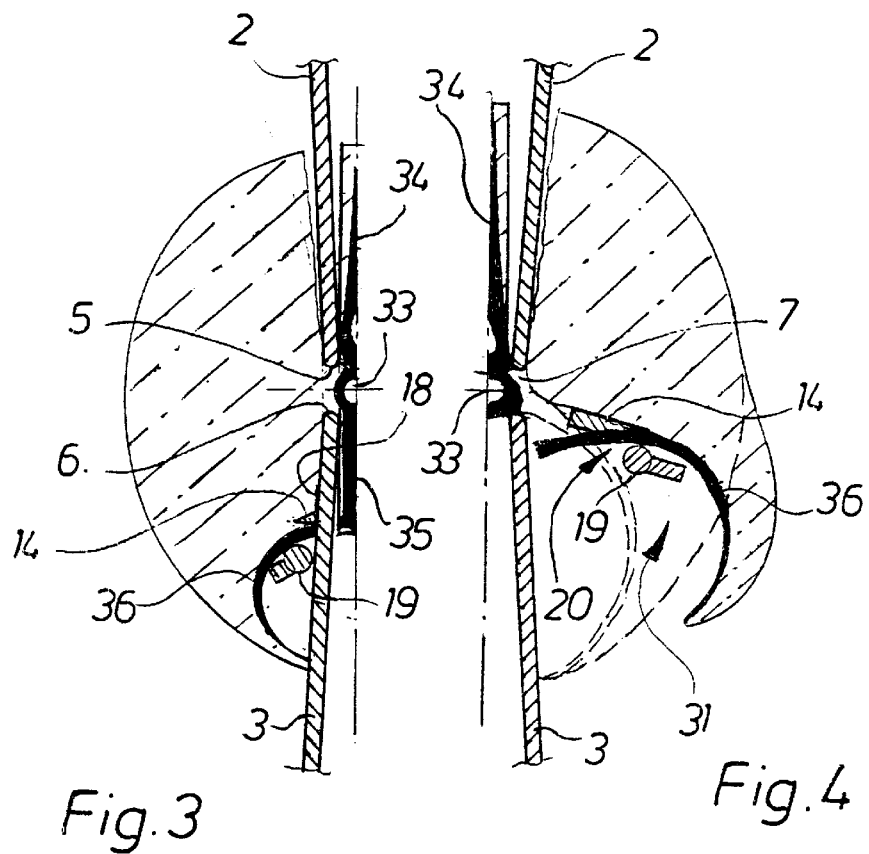
FIG. 3 shows a partial sectional view of the device shown in FIG. 1 at the section line III after the tail portion of the fish has run up onto the lowered tool for removing the ribs.
FIG. 4 is a partial sectional view of the device in FIG. 1 at the section line IV showing an advanced separation operation.

The fish deboning device 30 according to the invention comprises a frame which will not be described in detail here and in which is arranged a suitably driven endless conveyor 1 indicated by a dashed dotted line and having receiving saddles 1.2 for the fish. The conveyor describes a conveying path 1.1 for the fish together with a pair of back guides 2 mutually spaced by a gap 4 and a pair of belly guides 3, likewise mutually spaced by a gap 4, the guides being, respectively, arranged symmetrically on either side of a vertical plane. The back and belly guides 2, 3 are provided wish guiding edges 5, 6, respectively, which are mutually spaced to leave a gap 7, which defines the horizontal plane of the conveying path 1.1. At the level of the back guides 2 and upstream of these there is arranged a back filletting tool 8 comprising a pair of circular knives 9, while upstream of, and level with, the belly guides 3 there is arranged a belly filletting tool 10 which also comprises two circular knives 11. The circular knives 9 and 11 are spaced apart by a distance roughly corresponding to the gap 7. Downstream of, and at the same level as, the back knives 2 there are arranged two separating knives 12 having a mutual spacing which is a little larger than that of the circular knives 9 of the back filletting tool and which extend downwards into the gap 4 formed by the belly guides 3. The separating knives 12 perform the final separating cut to remove the fillets from the flanks of the vertebral column 33 and are driven to rotate as are the circular knives 9, 11 of the back filletting tool 8 and the belly filletting tool 10, respectively. Each fish is conveyed by means of a receiving saddle 1.2 which is advanced by the conveyor 1. The decapitated fish are mounted with their belly cavities 31 on the saddle and are advanced with their tail portions 32 leading.

A further tool 13 for removing the ribs 36 from the fillet meat is arranged adjacent the belly guides 3 between the belly filletting tool 10 and the separating knives 12 and comprises two tool parts arranged symmetrically on either side of the conveying path 1.1. Each tool part comprises a knife 14 having a point 15 directed towards the oncoming fish and a cutting edge 16 on the outside edge of the knife which extends from this point 15 to diverge away from the conveying path 1.1. Each knife 14 lies in a plane which, when viewed in cross-section, tilts outwards away from the conveying path 1.1 and which in the conveying direction likewise slopes downwards with respect to the conveying path 1.1. The cutting edge 16 is formed by a bevel 17 located on the underside of the knife 14 and is provided at the knife tip 15 with a short vertically extending blade. The cutting edge 16 opposes a supporting element 19 which is in the form of a rigid, nonresilient round rod, and is separated from this element by a gap 20. The supporting element 19 extends beyond the cutting edge 16 towards the oncoming fish and is formed at this end into a runner or skid 21 for receiving the fish and facilitating its entering onto the tool 13.

The knife 14 and the supporting element 19 are arranged to pivot about a common fixed axis 22 which extends parallel with, and at roughly the same horizontal level of, the conveying path 1.1. The knife 14 and the supporting element 19 are mounted on the axis independently of one another, each being connected, respectively, to an activation member 23, 24 by means of a lever arm. At the start of the processing path 1.1 there is arranged an appropriately designed thickness sensor 25 which acts on an angle decoder 26.

The angle decoder 26 generates a measurement signal indicative of the maximum thickness dimension of each fish and also registers the position of the head end of the fish by means of the signal jump as the cut face of the fish passes the sensor.

Figure 5:
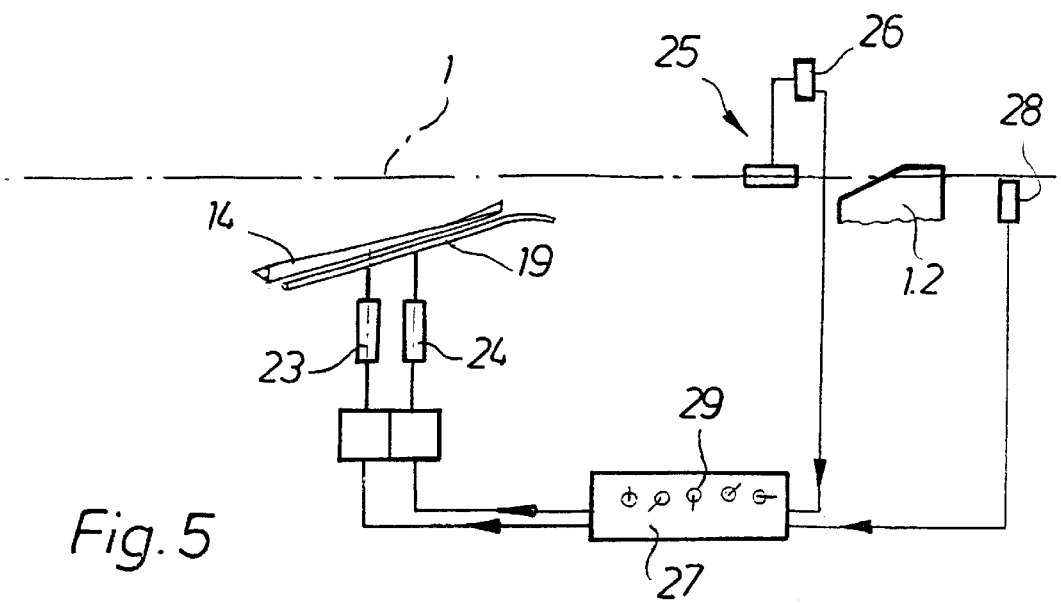
FIG. 5 shows a block diagram of the circuitry incorporating components for controlling and activating the device according to the invention and their functional and technical connections.

As shown in FIG. 5 a computer 27 receives the signals from the angle decoder 26 and also signals from a clockpulse generator 28 connected to conveyor 1. The computer 27 processes these signals and controls the actuation members 23, 24, which are preferably formed as step motors, accordingly. Selection switches 29 are provided and allow the required program to be selected and specified in advance so that the start of operation and working paths of the actuation members 23, 24 may be adapted to the anatomical characteristics of the different species of fish to be processed.

The operation of the device will now be described.

A fish 30 whose belly cavity 31 has been opened and which has been gutted is placed with its belly cavity 31 on a saddle 1.2 of the conveyor 1 such that the tail fin 32 points in the conveying direction. As the fish 30 is advanced by the conveyor 1, it pushes against the sensor face of the thickness sensor 25 and causes this to deflect. The largest deflection of the sensor is registered by the angle decoder 26 in the form of a measurement signal. A further measurement signal is delivered when the thickness sensor 25 slides off the decapitation end of the fish 30. The tail fin 32 of the fish 30 is subsequently guided between the circular knives 9 and 11 of the back and belly filletting tools 8, 10, respectively, causing these tools to cut into the fish up to the vertebral column 33 on either side of the back and belly spokes 34, 35, respectively. This causes the ribs 36 to become separated from the bone structure. As the fish 30 is advanced further, the back guides 2 and belly guides 3 extend into the cuts made by the previous tools and take over the guidance of the fish by sandwiching those parts of the fish containing the back spokes 34 and the belly spokes 35, respectively, between them.

In the meantime, the computer 27 will have processed the signals issued by the thickness sensor 25 and, using the signal from the clock-pulse generator 28 together with programmed data relating to the proportions of fish, have calculated when the tail-end of the belly cavity 31 will reach the point 15 of the knife 14 and also have determined what contour the dorsal-side limitation of the belly cavity 31 will have. The actuation member 23 is then controlled in accordance with these calculations, and, upon arrival of the belly-cavity end 31 of fish at the tool 13, guides the point 15 of the knife 14 into the fish to arrive in the area directly above the original location of attachment of the ribs 36 to the belly spokes 35 and, as the fish is advanced further, guides the knife 14 to follow the calculated belly cavity contour. During this operation, the vertical blade 18 at the point 15 of the knife 14 serves to cut the fillet meat away from the flanks of the vertebral column 33 at the head end of the belly cavity 31. At the same time, the supporting element 19 is guided into the belly cavity 31 of the fish by the actuation member 24, whereby the size of the gap 20 between the support member 19 and cutting edge 16 of the knife 14 is set to a value which takes into consideration the calculated thickness of the ribs at the tail-end of the belly cavity and which is determined by the computer 27 after processing the measurement signals from the thickness sensor 25. As the fish is advanced, the dimension of the gap 20 is controlled in accordance with the sectional dimension variation of the ribs 36.

Due to the diverging extension of the cutting edge 16, the ribs 36 buried in meat are progressively cut free from the inside of the fish outwards as the fish is conveyed. The control of the knife 14 and of the supporting element 19 allow an adjustment which, on the one hand, prevents the ribs 36 from becoming clamped or jammed and thus torn out and, on the other, results in an optimal yield of fillet meat. The functional precision of this tool can be still further increased by the use of a non-shown resiliently biased pressing element, which preferably takes the form of a round rod arranged over the gap 20 to apply pressure to the fish from the outside.

After the fish has passed this tool, the knife 14 and supporting element 19 can be moved to adopt an automatically controlled position in which the gap 20 is widened causing any remains clinging to the cutting blade 16 to be freed and so enabling the self-cleaning of the tool.

In principle, the above described apparatus can also be used for removing the bones of any type of fish, which do not allow a clear and definite positioning with respect to the tail-end of the belly cavity. Fish of this type include inter alia sea bass and various (sea) breams.

We claim:

1. A method for automatically deboning fish of the mackerel family, said fish having a backbone with back spokes extending from said backbone towards the dorsal side of the fish and belly spokes extending from said backbone towards the ventral side of said fish and a belly cavity surrounded by ribs, the dorsal side of said belly cavity being spaced from said backbone throughout substantially all its length by a number of said belly spokes corresponding to the length of said belly cavity, the method comprising the steps of advancing the fish along a conveying path and measuring to determine the position and size of each fish as it is advanced and generating corresponding measurement data, receiving and processing said measurement data with a processor to determine a contour of the belly cavity of the fish as a function of said measurement data, performing two cuts on the dorsal side of the fish to the backbone to separate the back spokes from the surrounding meat, performing two cuts on the ventral side of the fish to the backbone to separate the belly spokes from the surrounding meat, inserting a knife into the fish above the ribs at the dorsal side of belly cavity close to their previous location of attachment to said belly spokes, and following the dorsal-side contour of the belly cavity along the length while progressively cutting the meat away from the ribs from the dorsal side towards the ventral side of the belly cavity under control of said processor and simultaneously supporting said ribs from their underside closely to the cutting region.

2. A method as claimed in claim 1, comprising the additional step of performing two further cuts on either side of the backbone in planes extending between the dorsal and ventral sides of said fish to free said backbone from the surrounding meat.

3. An apparatus for deboning fish of the mackerel family, said fish having a backbone with back spokes extending from said backbone towards the dorsal side of the fish and belly spokes extending from said backbone towards the ventral side of said fish, said back spokes and belly spokes defining a plane of symmetry of the fish, and a belly cavity surrounded by ribs, the dorsal side of said belly cavity being separated from said backbone throughout substantially all its length by a number of said belly spokes corresponding to the length of said belly cavity, said apparatus comprising conveying means for defining a conveying path and advancing the fish along said conveying path with said backbone essentially aligned with said path, back separating means arranged on both sides of said conveying path for cutting free the back spokes, belly separating means arranged on both sides of said conveying path for cutting free the belly spokes, means for freeing the ribs arranged downstream of said back and belly separating means and comprising cutting means arranged on each side of said conveying path and having, respectively, a point directed towards the oncoming fish and a cutting edge extending from said point to diverge with respect to said conveying path in said conveying direction, each side cutting means being adapted and controlled to move along the dorsal side contour of the belly cavity above said ribs, measurement means arranged upstream of said separating means for determining the position and size of each fish as it is advanced by said conveying means and generating corresponding measurement data, and processing means for receiving said measurement data, determining the contour of the belly cavity as a function of said measurement data and controlling said cutting means.

4. An apparatus as claimed in claim 3, wherein each cutting means is associated with a first actuation member, said actuation member being adapted to control the displacement of said cutting means such that the point of said cutting means moves in a plane lying essentially parallel to the plane of symmetry of the fish.

5. An apparatus as claimed in claim 4, wherein said processing means are adapted to control the respective time of entry into operation and the control paths of said first actuation means.

6. An apparatus as claimed in claim 3, wherein said measurement means comprise a thickness sensor for registering the maximum thickness and the position of the trailing end of the fish.

7. An apparatus as claimed in claim 3, wherein each said means for freeing the ribs is associated with a supporting element which is arranged to oppose said cutting edge and is separated from said cutting edge by a gap.

8. An apparatus as claimed in claim 7, wherein said supporting element is associated with a second actuating member which is controllable by said processing means to adjust the dimension of said gap as a function of the measurement data from said measurement means.

9. An apparatus as claimed in claim 3, wherein said conveyor comprises at least one receiving saddle onto which the belly cavity of the decapitated fish is seated and with which the fish is advanced with the tail-end leading.

10. An apparatus as claimed in claim 3, further comprising guiding means extending along the length of the conveying path and adapted to enter into cuts made by the separating means for cutting free the belly and back spokes and thereby guide the fish.

* * * * *